(12) United States Patent
Sakai et al.

(10) Patent No.: US 8,693,068 B2
(45) Date of Patent: Apr. 8, 2014

(54) IMAGE READING APPARATUS, IMAGE FORMING APPARATUS AND COMPUTER-READABLE MEDIUM

(75) Inventors: Norikazu Sakai, Kanagawa (JP); Mitsuo Shimizu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 105 days.

(21) Appl. No.: 13/368,669

(22) Filed: Feb. 8, 2012

(65) Prior Publication Data

US 2013/0070309 A1 Mar. 21, 2013

(30) Foreign Application Priority Data

Sep. 21, 2011 (JP) ................................ 2011-206119

(51) Int. Cl.
*H04N 1/04* (2006.01)

(52) U.S. Cl.
USPC .......................... 358/474; 358/448; 358/488

(58) Field of Classification Search
USPC .......... 358/474, 475, 514, 461, 448, 520, 449
See application file for complete search history.

(56) References Cited

U.S. PATENT DOCUMENTS

| | | | | |
|---|---|---|---|---|
| 4,774,591 A * | 9/1988 | Matsunawa et al. | ........... | 358/444 |
| 5,214,518 A * | 5/1993 | Kato | ............... | 358/448 |
| 5,317,421 A * | 5/1994 | Ito | ................. | 358/464 |
| 6,070,445 A * | 6/2000 | Holierhoek | ....... | 72/61 |
| 6,611,360 B1 * | 8/2003 | Kataoka | ........... | 358/461 |
| 7,289,249 B2 * | 10/2007 | Sone | ................ | 358/461 |
| 7,518,760 B2 * | 4/2009 | Matsuda | ............ | 358/474 |
| 7,755,813 B2 * | 7/2010 | Nishikawa et al. | ........... | 358/497 |
| 7,782,498 B2 * | 8/2010 | Hoshi | ................ | 358/474 |
| 8,310,733 B2 * | 11/2012 | Sekiguchi et al. | ............ | 358/474 |
| 8,345,327 B2 * | 1/2013 | Mikami | ........... | 358/475 |
| 8,390,900 B2 * | 3/2013 | Sakane | ............ | 358/461 |
| 8,405,887 B2 * | 3/2013 | Oumi | ............... | 358/475 |
| 8,467,111 B2 * | 6/2013 | Kamio et al. | ................ | 358/475 |
| 8,482,809 B2 * | 7/2013 | Mikami | ........... | 358/406 |
| 8,503,049 B2 * | 8/2013 | Kattou et al. | ................ | 358/498 |
| 8,508,807 B2 * | 8/2013 | Tanaka et al. | ................ | 358/461 |

FOREIGN PATENT DOCUMENTS

JP 2010011297 A 1/2010

* cited by examiner

*Primary Examiner* — Negussie Worku
(74) *Attorney, Agent, or Firm* — Sughrue Mion, PLLC

(57) ABSTRACT

An image reading apparatus includes a reading unit, an extraction unit and a generation unit. The reading unit outputs reference plate reading information. The extraction unit sets a pixel of the reference plate reading information as a notice pixel and repeatedly extracts one of the notice pixel as a target pixel until the number of the target pixels is more than a predetermined value when a ratio of a pixel value of the notice pixel to an initial value is more than a predetermined range. The generation unit generates correction information by substituting a pixel value of the target pixel with a correction value using the initial value when the extraction unit extracts all pixels of the reference plate reading information, and generates correction information by setting the pixel values of all the pixels as the initial value when the extraction unit does not extract all the pixels.

5 Claims, 9 Drawing Sheets

IMAGE READING APPARATUS, IMAGE FORMING APPARATUS AND COMPUTER-READABLE MEDIUM

CROSS-REFERENCE TO RELATED APPLICATION

This application is based on and claims priority under 35 USC 119 from Japanese Patent Application No. 2011-206119 filed Sep. 21, 2011.

BACKGROUND

Technical Field

The present invention relates to an image reading apparatus, an image forming apparatus and a computer-readable medium.

SUMMARY (1) According to an aspect of the invention, an image reading apparatus includes a reading unit, an extraction unit and a generation unit. The reading unit includes a plurality of photoelectric conversion elements and outputs reading information indicating pixel values for each pixel corresponding to each of the photoelectric conversion elements by reading a document and a reference plate. The reading unit outputs reference plate reading information by reading the reference plate. The extraction unit sets a pixel of the reference plate reading information as a notice pixel and that repeatedly extracts one of the notice pixel as a target pixel until the number of the target pixels is more than a predetermined value when a ratio of a pixel value of the notice pixel to an initial value is more than a predetermined range, a value of the initial value being set according to a pixel position in advance. The generation unit generates correction information. When the extraction unit extracts all pixels of the reference plate reading information, the generation unit generates the correction information acquired by substituting a pixel value of the target pixel with a correction value using the initial value in the reference plate reading information. When the extraction unit does not extract all the pixels of the reference plate reading information, the generation unit generates the correction information acquired by substituting the pixel value of the target pixel with the correction value using the initial value and by substituting a pixel value of a pixel which is not set as the notice pixel with the initial value in the reference plate reading information, or the generation unit generates the correction information acquired by setting the pixel values of all the pixels as the initial value in the reference plate reading information.

BRIEF DESCRIPTION OF THE DRAWINGS

Exemplary embodiments of the invention will be described in detail based on the following figures, wherein.

DETAILED DESCRIPTION

Hereinafter, embodiments of the present invention will be described with reference to the accompanying drawings.

First, referring to FIG. 1, an overall configuration of an image reading apparatus 10 according to a first embodiment will be described.

Figure 1:
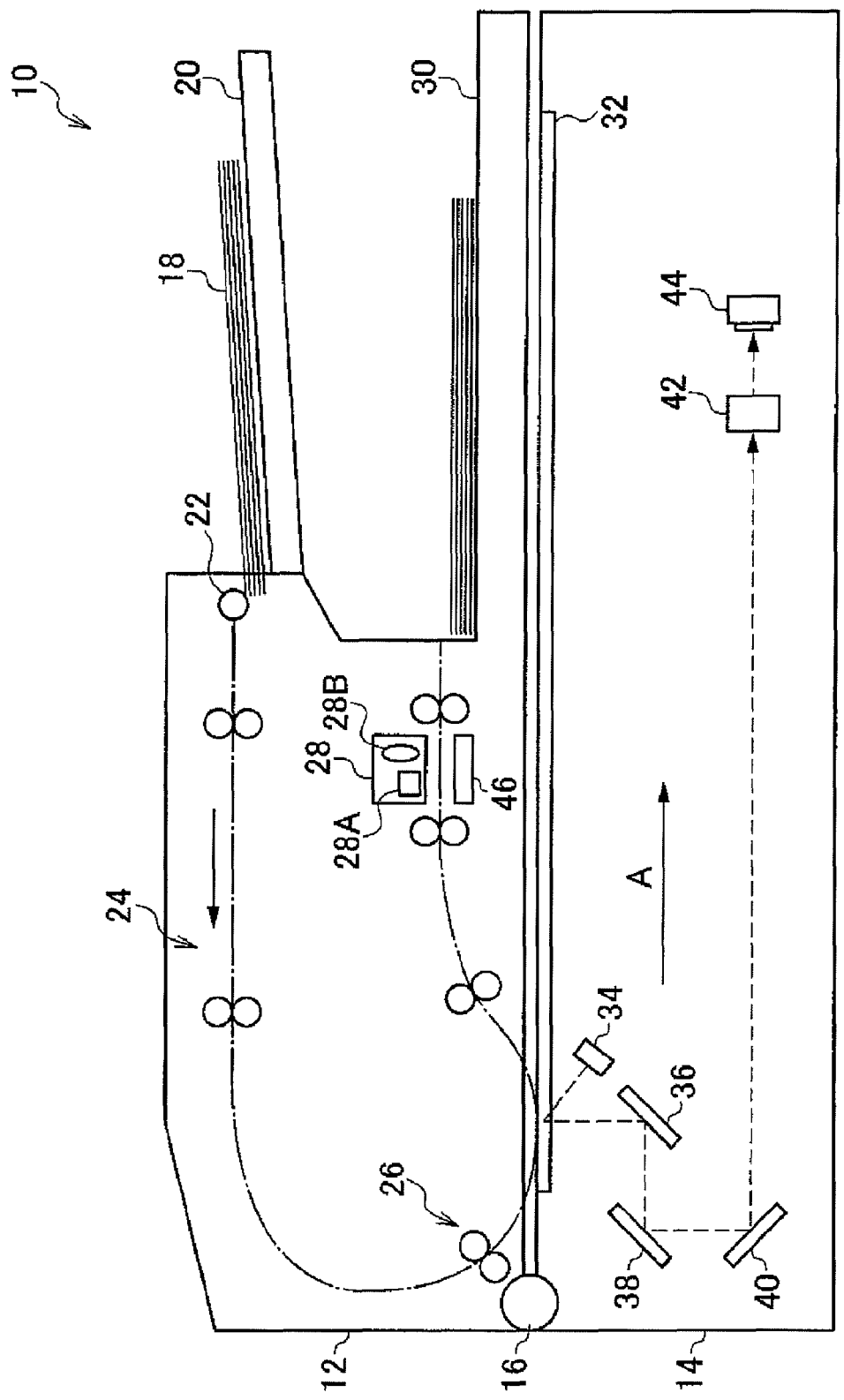
FIG. 1 is a diagram illustrating an overall configuration of an image reading apparatus according to a first embodiment.

As shown in FIG. 1, the image reading apparatus 10 includes a dual auto document feeder (DADF) 12 including a rear surface image reading unit 28, and a surface image reading unit 14.

The DADF 12 is configured to include a platen 20 on which a document 18 recorded with an image is placed, a taking out roll 22 that takes out the documents 18 placed on the platen 20 one by one, a transport path 24 with a plurality of pairs of transport roll 26, the rear surface image reading unit 28, a reference plate 46 placed opposite to the rear surface image reading unit 28, and a paper ejecting unit 30 in which a document of which reading is completed is ejected.

The rear surface image reading unit 28 is a fixed and contact type image sensor configured to include a light source 28B that has a plurality of light emitting elements arranged in a main scanning direction and irradiates illumination light to the document 18 and the reference plate 46, and a line sensor 28A that photo-measures the document 18 and the reference plate 46 illuminated by the light source 28B which are divided into a plurality of pixels and outputs reading data depending on a pixel value photo-measured for each pixel. The rear surface image reading unit 28 includes a rod lens array (not shown) and the light reflected at the document 18 or the reference plate 46 is photo-measured by the line sensor 28A through the rod lens array. The reference plate 46 as a reference plate which is read by the line sensor 28A in shading correction information generation processing to be described below may adopt, for example, a white resin plate or a metal plate painted with a white color.

Meanwhile, the surface image reading unit 14 includes a transparent platen glass 32 where the document 18 may be provided on the top surface thereof and a surface reading position is positioned on the top surface of the platen glass 32. A light source 34 configured to irradiate the illumination light toward the surface of the document 18, a first reflection mirror 36 configured to receive the reflection light reflected at the surface of the document 18, a second reflection mirror 38 configured to bend a progression direction of the reflection light reflected by the first reflection mirror 36 at 90°, and a third reflection mirror 40 configured to further bend a progression direction of the reflection light reflected by the second reflection mirror 38 at 90° are provided below the platen glass 32 at the surface reading position. The surface image reading unit 14 includes a lens 42 and a photoelectric conversion unit 44 including a plurality of pixels. The surface image reading unit 14 reads the surface of the document 18 by imaging the reflection light reflected at the third reflection mirror 40 to the photoelectric conversion unit 44 by the lens 42.

According to the image reading apparatus 10 of the first embodiment configured as described above, the document 18 placed on the platen 20 is taken out by the taking out roll 22 one by one to be sent to the transport path 24.

The document 18 sent to the transport path 24 is transported up to the surface reading position by the surface image reading unit 14 by the pairs of transport roll 26 and the surface of the document 18 may be read by the surface image reading unit 14. Thereafter, the document 18 is transported to the rear surface image reading unit 28 installed at the transporting direction downstream side of the surface reading position, and a rear surface of the document 18 is read by the rear surface image reading unit 28 and thereafter, the document 18 is ejected to the paper ejecting unit 30.

In the image reading apparatus 10 according to the first embodiment, a fluorescent lamp is adopted as the light source 34, but the present invention is not limited thereto, and other light sources such as, for example, a plurality of light emitting diodes (LED) arranged in a direction crossing the transporting direction of the document 18 may be adopted.

In the image reading apparatus 10 according to the first embodiment, as the photoelectric conversion unit 44, a charge coupled device (CCD) line sensor constituted by a plurality of CCDs is adopted, but the present invention is not limited thereto, and a solid photographing element such as, for example, a complementary metal-oxide semiconductor (CMOS) image sensor may be adopted.

In the image reading apparatus 10 according to the first embodiment, the light source 34, the first reflection mirror 36, the second reflection mirror 38, and the third reflection mirror 40 are movable in the direction of arrow A of FIG. 1. As a result, when the DADF 12 is opened above the surface image reading unit 14 and the document 18 is placed on the top surface of the platen glass 32, the image recorded in the document 18 may be read by moving the light source 34, the first reflection mirror 36, the second reflection mirror 38, and the third reflection mirror 40 in the direction of arrow A while the illumination light from the light source 34 is irradiated toward the document 18.

Figure 2:
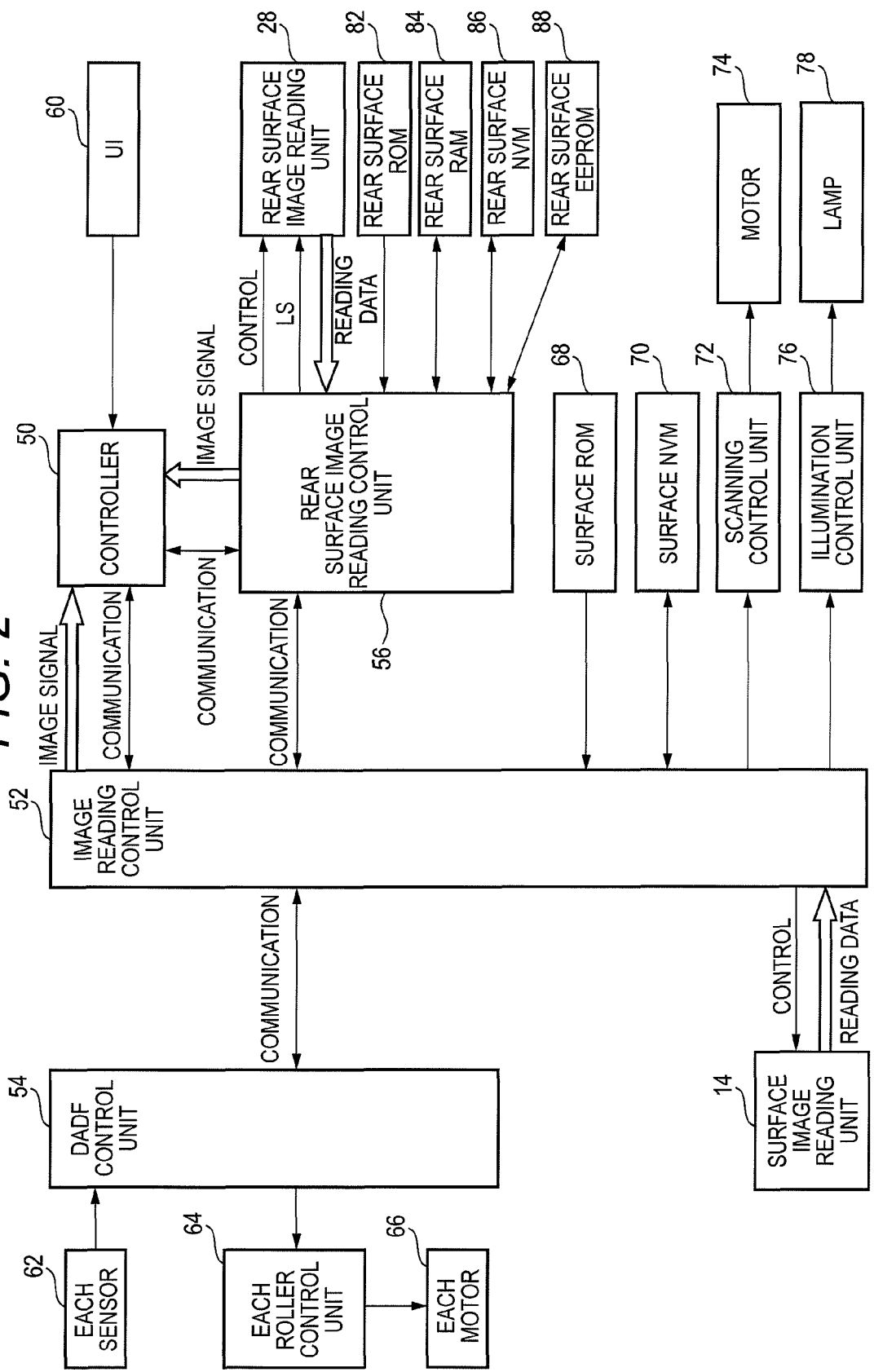
FIG. 2 is a diagram illustrating a hardware configuration of the image reading apparatus.

Next, a hardware configuration of the image reading apparatus 10 will be described with reference to FIG. 2. The image reading apparatus 10 is configured to primarily include a controller 50, an image reading control unit 52, a DADF control unit 54, a rear surface image reading control unit 56, and a user interface (UI) 60.

Among them, the controller 50 controls the entirety of the image reading apparatus 10. The controller 50 receives reading data from each of the image reading control unit 52 and the rear surface image reading control unit 56. The controller 50 receives a signal indicating a user's instructions which is inputted from the UI 60.

The image reading control unit 52 controls the entire reading process of the image in the image reading apparatus 10, and specifically, controls for example, the DADF control unit 54, the rear surface image reading control unit 56, the surface image reading unit 14, a scanning control unit 72, and an illumination control unit 76. The image reading control unit 52 is configured to be accessible to a surface read only memory (ROM) 68 and a surface non volatile memory (NVM) 70. Various programs for reading the surface of the document or various information used at that time are stored in the surface ROM 68 or the surface NVM 70.

The scanning control unit 72 controls the scanning when reading the document and also controls a motor 74. The motor 74 integrally moves the light source 34 and various mirrors described in FIG. 1. The illumination control unit 76 controls the light source 34.

The DADF control unit 54 controls the DADF and receives information from each roller control unit 64 that controls each motor 66 for rotating the taking out roll 22 or the pairs of transport roll 26 described above and from each sensor 62. As an example of each sensor 62, a sensor that detects whether the DADF 12 is opened above the surface image reading unit 14 may be adopted.

The rear surface image reading control unit 56 controls the rear surface image reading unit 28. The rear surface image reading control unit 56 is configured to be accessible to a rear surface ROM 82, a rear surface random access memory (RAM) 84, a rear surface NVM 86, and a rear surface electrically erasable and programmable read only memory (EEPROM) 88.

A program for operating the rear surface image reading control unit 56 or various information used at that time is stored in the rear surface ROM 82 and the rear surface NVM 86. The rear surface RAM 84 is used when the rear surface image reading control unit 56 operates. Initial data displayed as a pixel value (initial value) for each pixel acquired by photo-measuring a reference plate (an exclusive clean white reference plate different from the reference plate 46) without stain by the line sensor 28A without stain is stored in the rear surface EEPROM 88. Herein, the stain includes all stains that can be assumed to be attached to the line sensor 28A or the reference plate 46, such as paper powder and toner powder. Herein, the case of using the initial data acquired from the clean white reference plate is described, but the initial data may be data to judge a stain pixel by comparing with reference plate reading data outputted by reading the reference plate 46 in a processing to be described below.

Figure 3:
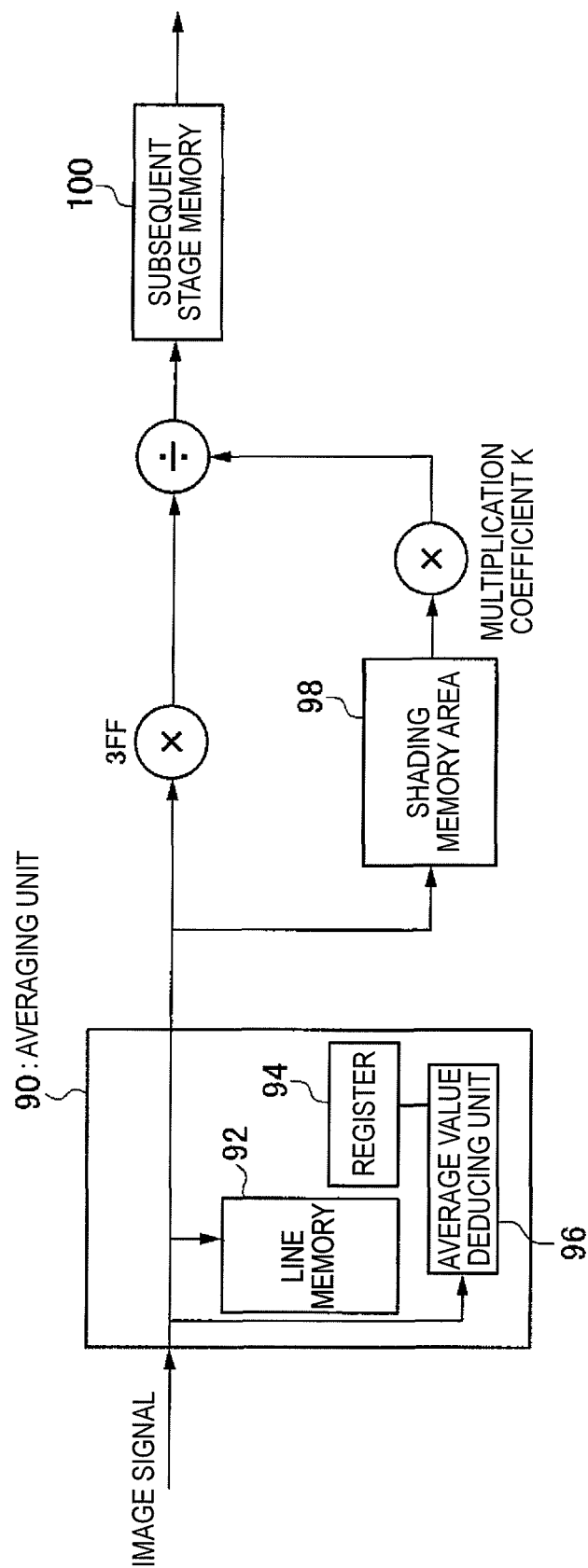
FIG. 3 is a diagram illustrating a rear surface image reading control unit in detail.

Next, referring to FIG. 3, the rear surface image reading control unit 56 will be described in detail. The rear surface image reading control unit 56 has an averaging unit 90 including a line memory 92, an average value deducing unit 96, and a register 94, as shown in FIG. 3. Among them, the line memory 92 stores pixel information (pixel value) from reading data outputted by reading in the rear surface image reading unit 28. The average value deducing unit 96 deduces a pixel value average value that represents an average value of the pixel value represented by the pixel information. The average value is stored in the register 94.

The pixel value outputted from the averaging unit 90 is, for example, 3FF (10 bits: hexadecimal) times as an integer. Shading correction information which is represented by each correction value (shading correction pixel value) for shading-correcting each pixel value is stored in a shading memory area 98, and the 3FF times pixel value is divided by a shading correction pixel value multiplied by a corresponding multiplication coefficient K and the divided value is stored in a subsequent stage memory 100. The corrected pixel value stored in the subsequent stage memory 100 is subjected to various image processing.

Herein, shading correction information stored in the shading memory area 98 will be described.

Figure 4:
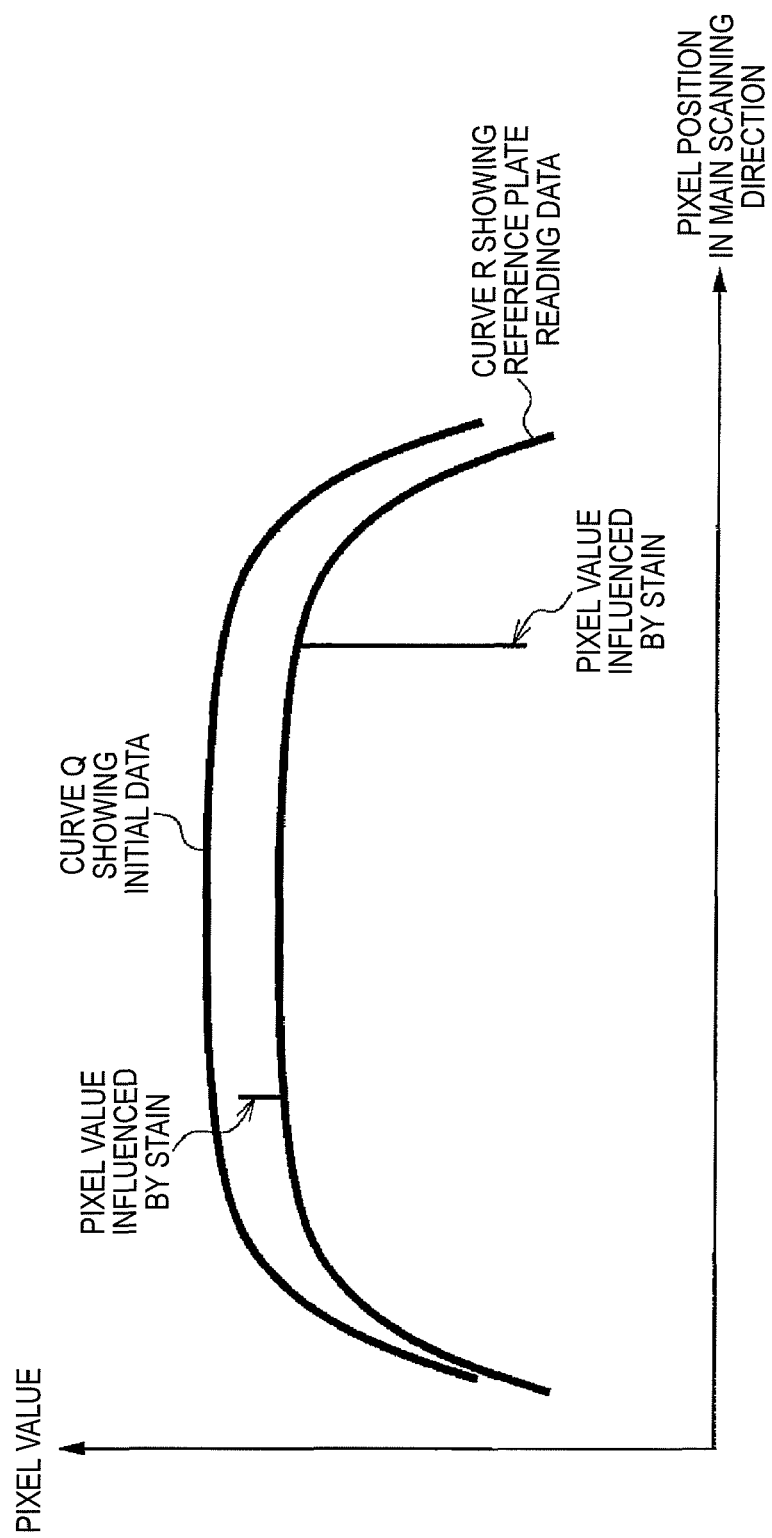
FIG. 4 is a diagram illustrating a curve corresponding to initial data and a curve corresponding to reference plate reading data.

FIG. 4 shows a graph of a curve Q indicating initial data and a curve R indicating reference plate reading data acquired by reading the reference plate 46. In FIG. 4, a horizontal axis represents the position of the pixel in the main scanning direction and a vertical axis represents a pixel value. Approximately two pixel values influenced by the stain are displayed in the reference plate reading data. In this state, a pixel value (initial value) of the pixel of the initial data and a pixel value (reference plate pixel value) of the pixel of the reference plate reading data, having the same position, are set to α and β, respectively, and value of a ratio thereof (β/α) is examined.

In a case where a reference plate pixel value is not influenced by the stain, since the curve Q and the curve R are substantially similar to each other, the β/α becomes a value within a predetermined range. Meanwhile, in a case where a reference plate pixel value is influenced by the stain, there is a high possibility that the β/α value will become a value outside the predetermined range. Specifically, when the reference plate pixel value is not influenced by the stain, the β/α value is distributed around a predetermined value (for example, 1.0), but when the reference plate pixel value is influenced by the stain, there is a high possibility that the β/α value will be largely different from 1.0. The pixel which is influenced by the stain is extracted as the stain pixel, and a shading correction pixel value for removing the influence by the stain from a pixel value represented by reading data obtained by reading the document is deduced.

As the shading correction pixel value, a case can be considered where the reference plate pixel value of the stain pixel is substituted with a correction value using an initial value or a case can be considered where the reference plate pixel value of the stain pixel is substituted with the initial value. However, when the initial value is used as the shading correction pixel value, a vertical strip is generated according to the positional deviation of a lens stain as disclosed in JP 2010-011297 A which is problematic. Meanwhile, when the reference plate pixel value of the stain pixel is substituted with the correction value using the initial value as the shading correction value, a problem occurs as the processing amount becomes excessive depending on the number of the stain pixels. Therefore, in the present embodiment, shading correction information is selectively generated either using the initial value or substituting with the correction value depending on the number of extracted stain pixels.

Figure 5:
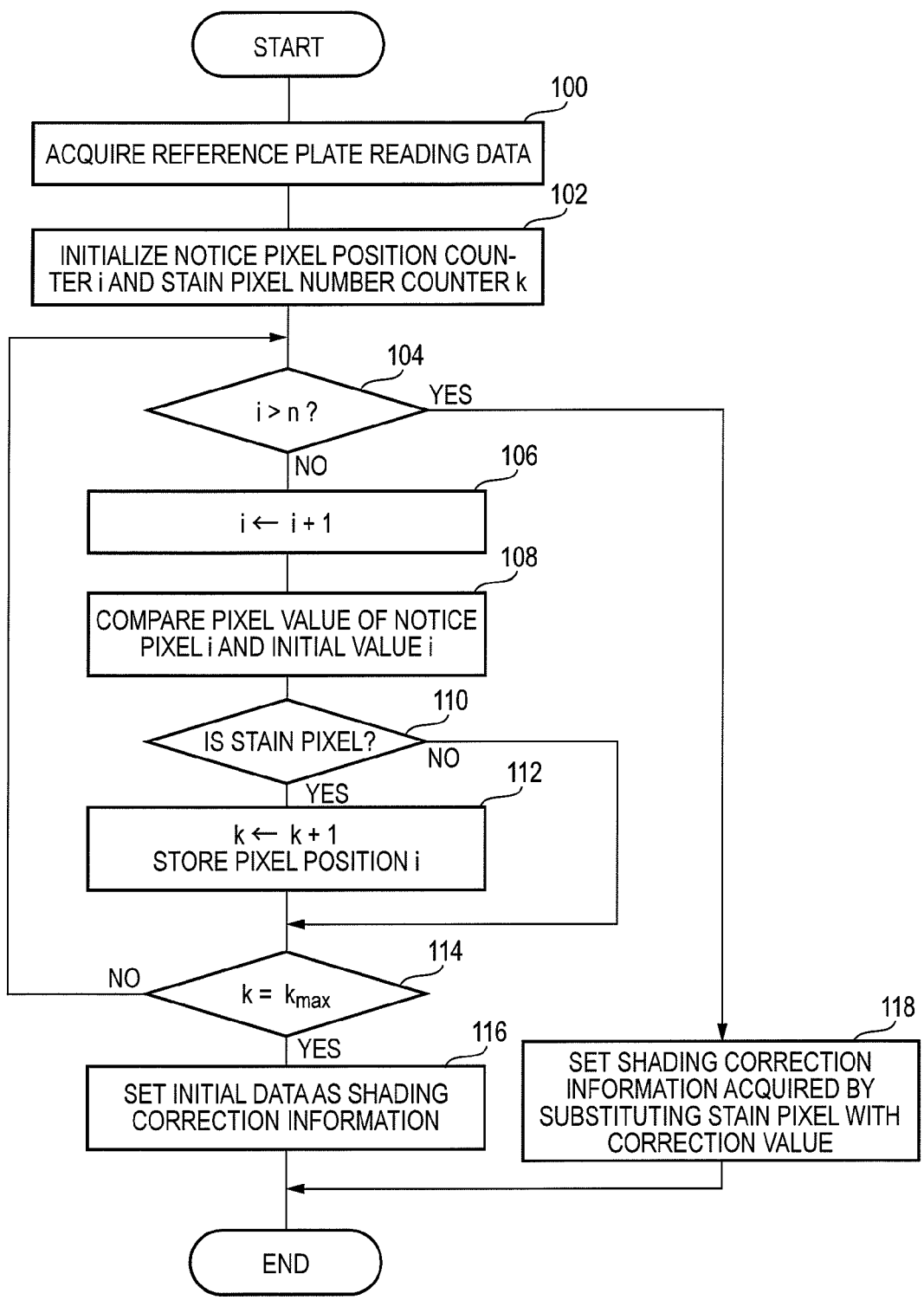
FIG. 5 is a flowchart illustrating a content of a shading correction information generation processing routine in the image reading apparatus according to the first embodiment.

Next, referring to FIG. 5, the shading correction information generation processing routine will be described, which is executed in the image reading apparatus of the first embodiment. The routine is executed just before the reading of the document.

At step 100, the reference plate reading data are acquired by reading the reference plate 46 by the rear surface image reading unit 28.

Next, at step 102, a notice pixel position counter i which is a variable representing a pixel position of a notice pixel set in the reference plate reading data and a stain pixel number counter k for counting the number of extracted stain pixels are initialized (set to 0, respectively). For example, a pixel position of the right end of the reference plate reading data may be set to 1, a pixel position of a subsequent left pixel may be set to 2, and so on, and a pixel position of the left end may be set to n.

Next, at step 104, by determining whether the pixel position counter i is larger than n, it is determined whether all pixels of the reference plate reading data are set as the notice pixel. When the notice pixel position counter i is equal to or less than n, the process proceeds to step 106 to increase the notice pixel position counter i by 1, and the process proceeds to step 108.

At step 108, the initial data stored in the rear surface EEPROM 88 is read. The pixel of the pixel position i of the reference plate reading data acquired at step 100 is set as the notice pixel i, and compared with the pixel value (initial value) i of the pixel position i of the read initial data. For example, a ratio of the pixel value of the notice pixel i to the initial value i is calculated and is compared with a predetermined range.

Next, at step 110, it is determined whether the notice pixel i is the stain pixel based on the comparison result at step 108. For example, when the ratio is more than the predetermined range, it may be determined that the notice pixel i is the stain pixel. When the notice pixel i is the stain pixel, the process proceeds to step 112 to increase the stain pixel number counter k by 1, and the pixel position i is stored in a predetermined storage area, and the process proceeds to step 114. Meanwhile, when the notice pixel i is not the stain pixel, the process proceeds to step 114 directly.

At step 114, it is determined whether the stain pixel number counter k becomes a predetermined upperlimit value $k_{max}$. The upperlimit value $k_{max}$ is predetermined according to a processing capability of the apparatus or precision required for shading correction. If $k \neq k_{max}$, the process returns to step 104, and the processing at steps 104 to 114 are repeated. When not positively determined at step 104 but positively determined at step 114, that is, when the stain pixel number k is more than the upperlimit value $k_{max}$ before processing is terminated with respect to all the pixels of the reference plate reading data, the process proceeds to step 116. At step 116, the initial data are set as the shading correction information and stored in the shading memory area 98, and the processing is terminated. In this case, the vertical strip by the lens stain still occurs, but is smaller as compared to the influence caused by the remaining stain pixel.

Meanwhile, when not positively determined at step 114 but positively determined at step 104, that is, when the processing of all the pixels of the reference plate reading data is terminated while the stain pixel number k is not more than the upperlimit value $k_{max}$, the process proceeds to step 118. At step 118, the pixel position of the stain pixel stored in the predetermined area at step 112 is read, and the shading correction information acquired by substituting the pixel value of the stain pixel in the reference plate reading data with the correction value using the initial value of the same pixel position of the initial data is generated, and stored in the shading memory area 98. Thereafter, the processing is terminated.

The correction value used for substitution at step 118 may be deduced as described below. In the following description, a variable put with a parenthesis like A[ ] represents an array. A[ ]←B[ ] represents that array B is substituted into array A. That is, the ones having the same subscription have the same value by the substitution. As described above, the initial data InitDT[ ] is stored in the rear surface EEPROM 88. A correction average value InitAve of an average value of all pixels of the initial data InitDT[ ] is stored in the rear surface NVM 86.

Figure 6:
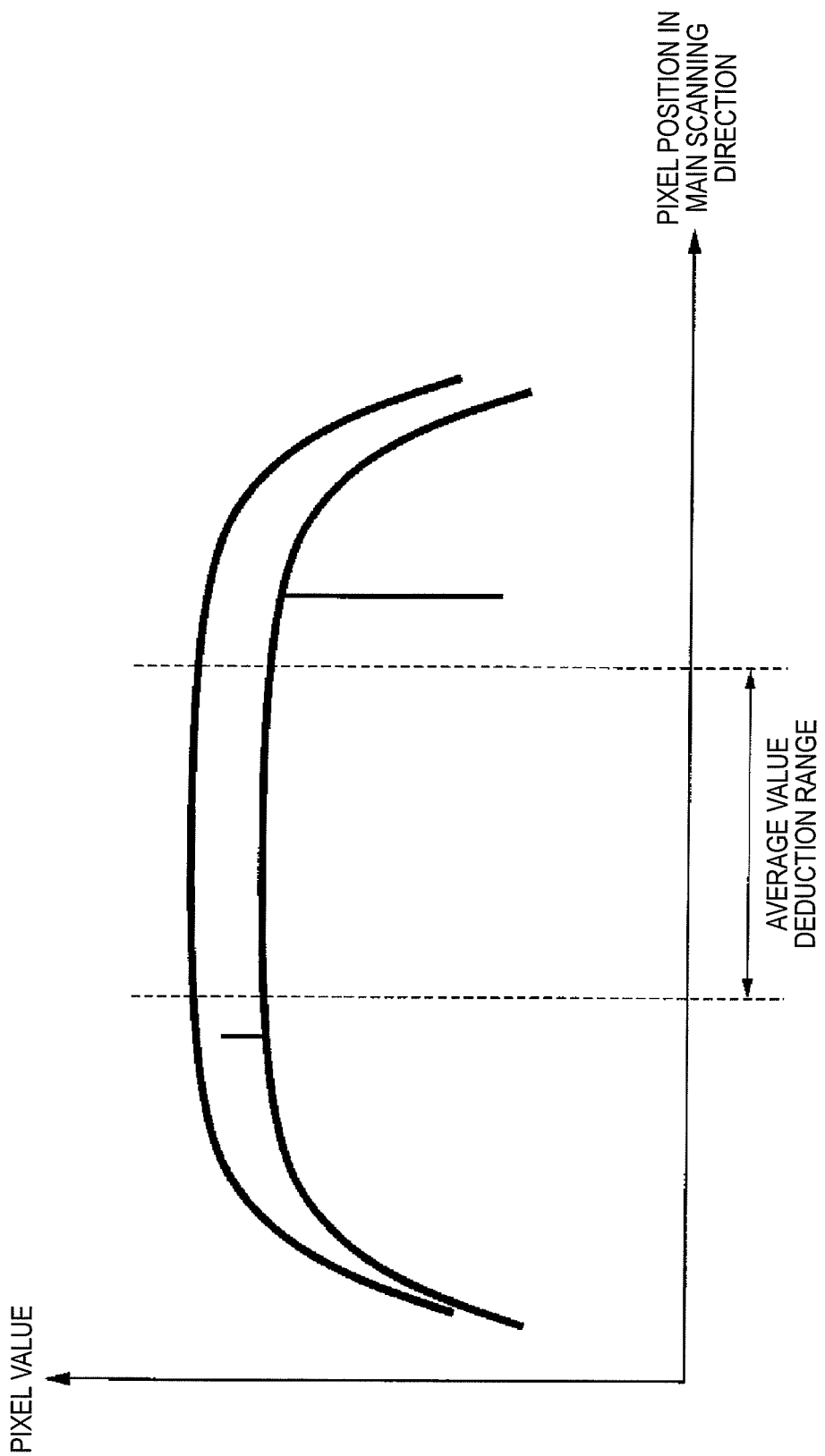
FIG. 6 is a diagram illustrating an average value deduction section.

First, the reference plate pixel value of the reference plate reading data acquired at step 100 is substituted into SampAveDT[ ]. An average value of all or some of SampAveDT[ ] is deduced and substituted into a pixel value average value SampAve. Herein, the average value of a portion of SampAveDT[ ] represents average pixel values of pixels which exist in an average value deduction section when a center portion in the main scanning direction is set as the average value deduction section, as shown in FIG. 6. SampAveDT[ ] and SampAve are once held on the line memory 92 and the register 94, respectively.

A ratio of the average pixel value SampAve to the correction average value InitAve (SampAve/InitAve) is substituted into the multiplication coefficient K. A value acquired by multiplying initial data InitDT[i] by the multiplication coefficient K is set as a correction value CorInitDT[i] of the pixel position i. The multiplication by the multiplication coefficient K is used to set each value of InitDT[ ] to be substantially the same as each value of SampAveDT[ ]. That is, the multiplication is used to set a ratio of each value of CorInitDT[ ] and each value of SampAveDT[ ] to approximately 1.0.

That is, the reference plate pixel value SampAveDT[i] for the pixel position i of the stain pixel to be substituted is substituted with a value CorInitDT[i] acquired by multiplying the initial data InitDT[i] by K, the ratio of the average pixel value SampAve and the correction average value InitAve.

Shading correction is performed with respect to the reading data obtained by reading the document by using the shading correction information generated as described above.

Next, a second embodiment will be described. Since a configuration of an image reading apparatus of the second embodiment is the same as that of the image reading apparatus 10 of the first embodiment, a description thereof will be omitted.

Figure 7:
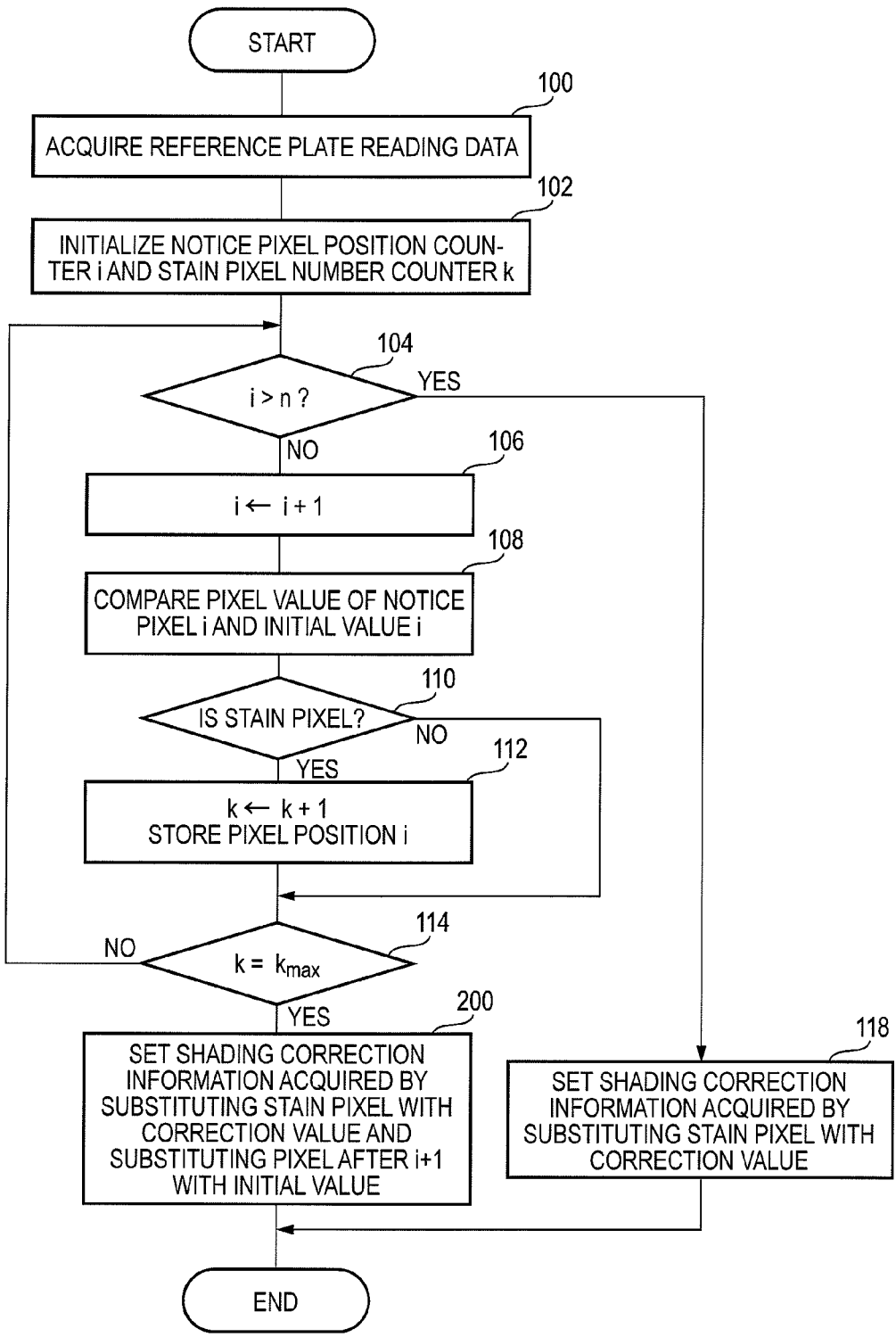
FIG. 7 is a flowchart illustrating a content of a shading correction information generation processing routine in an image reading apparatus according to a second embodiment.

In the image reading apparatus of the second embodiment, since shading correction information generation processing is different from that of the first embodiment, a shading correction information generation processing routine of the second embodiment will be described with reference to FIG. 7. In the shading correction information generation processing of the second embodiment, processing step 200 is executed instead of the processing step 116 of the shading correction information generation processing of the first embodiment.

When not positively determined at step 104 but positively determined at step 114, that is, when the stain pixel number k is more than the upperlimit value $k_{max}$ before the processing is terminated with respect to all the pixels of the reference plate reading data, the process proceeds to step 200. At step 200, the pixel position of the stain pixel stored in the predetermined area at step 112 is read, and the pixel value of the stain pixel in the reference plate reading data is substituted with the correction value using the initial value of the same pixel position of the initial data. As the correction value, the same correction value as the correction value used at step 118 of the shading correction information generation processing of the first embodiment may be used. Pixel values of pixels of which the pixel positions are subsequent to i+1, that is, pixels which are not subjected to the processing of steps 108 to 112 are substituted with the initial values of the same pixel positions of the initial data. By conducting the process as described above, the shading correction information is generated and stored in the shading memory area 98 and the processing is terminated.

Next, a third embodiment will be described. Since the configuration of an image reading apparatus of the third embodiment is the same as that of the image reading apparatus 10 of the first embodiment, description thereof will be omitted.

Figure 8:
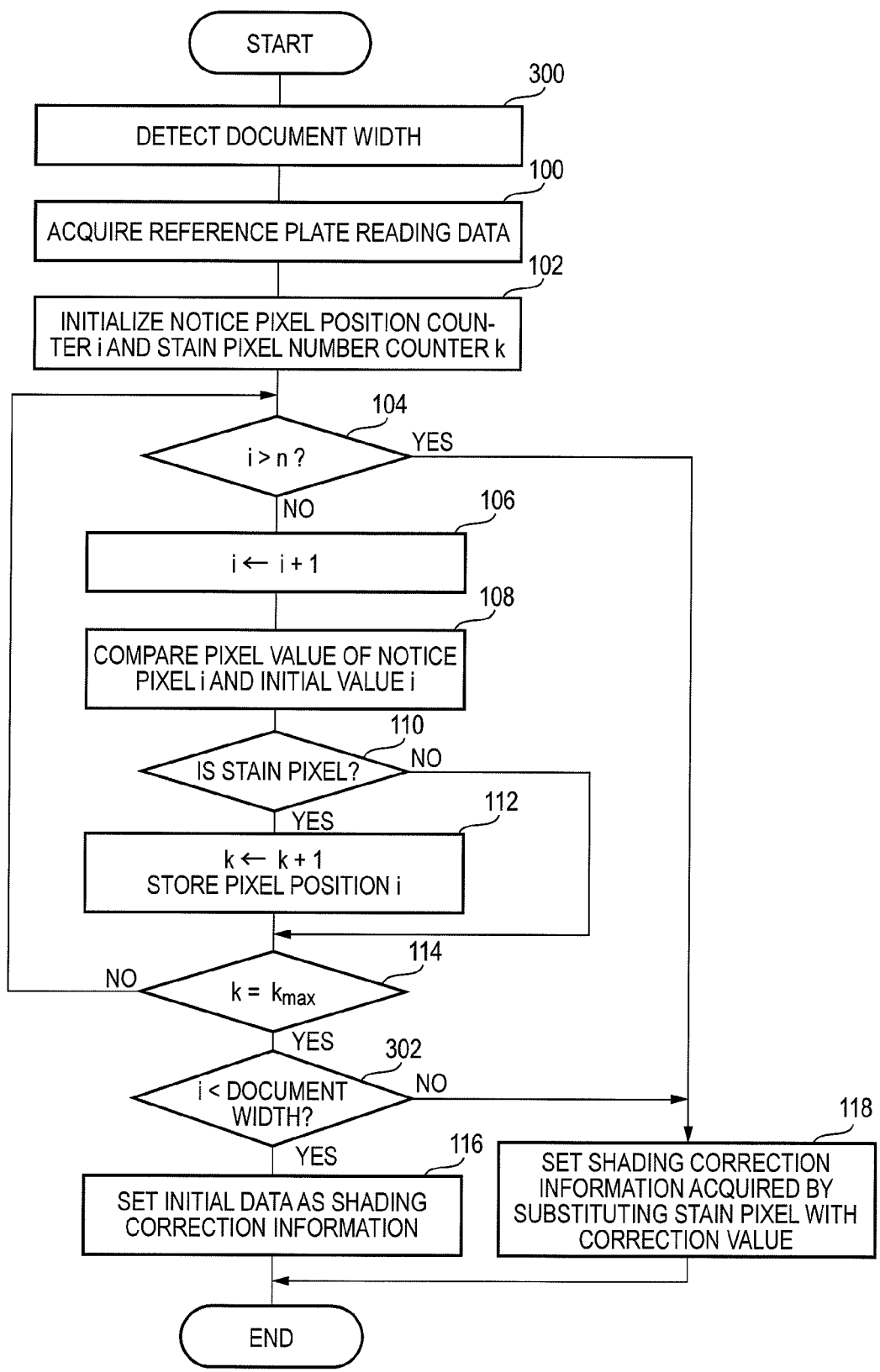
FIG. 8 is a flowchart illustrating a content of a shading correction information generation processing routine in an image reading apparatus according to a third embodiment.

In the image reading apparatus of the third embodiment, shading correction information generation processing is different from that of the first embodiment, and a shading correction information generation processing routine of the third embodiment will be described with reference to FIG. 8. The same reference numerals are given to the same processings as the first embodiment and a detailed description thereof will be omitted.

First, at step 300, the width of a document to be read is detected in reading the document executed after the routine. Herein, for ease of description, it is assumed that a document 18 is set so that a right end of the document and a right end (a reading start position of the line sensor 28A) of the line sensor 28A coincide with each other. That is, the document width is detected as an area corresponding to a pixel position of the line sensor 28A.

Next, steps 100 to 114 are executed similarly as the first embodiment.

When not positively determined at step 104 but positively determined at step 114, that is, when the stain pixel number k is more than the upperlimit value $k_{max}$ before processing is terminated with respect to all the pixels of the reference plate reading data, the process proceeds to step 302.

At step 302, it is determined whether the pixel position i is smaller than the document width. For example, when the document width detected at step 300 is for m pixels, it is determined whether i<m. If i<m, the stain pixel number k is more than the upperlimit value $k_{max}$ before the processing of pixels in the area corresponding to the document width of the reference plate reading data is terminated, and as a result, the process proceeds to step 116. Meanwhile, if i≥m, the stain pixel number k is not more than the upperlimit value $k_{max}$ at least in the area corresponding to the document width of the reference plate reading data, and as a result, the process proceeds to step 118. In this case, even though the stain pixel remains at the pixel position after i+1, there is no influence on the reading data of the document.

The third embodiment described the case in which the right end of the document and the right end of the line sensor 28A coincide with each other, but, may be applied even in the case, for example, in which the document is set to the center of a readable area of the line sensor 28A. In this case, a range from a pixel position corresponding to the right end of the document to a pixel position corresponding to a left end is detected as the document width, and the processing steps 108 through 112 may be executed from the pixel position corresponding to the right end of the document.

Even in the third embodiment, step 200 may be executed instead of step 116 as in the second embodiment.

In a processing flow of each of the flowcharts described in the first to third embodiments as an example, a processing sequence may be replaced, a new step may be added, or an unnecessary step may be deleted within the scope without departing from the spirit of the present invention.

Next, a fourth embodiment will be described. The fourth embodiment is an image forming apparatus 11 with the image reading apparatus 10 of any one of the first to third embodiments.

Figure 9:
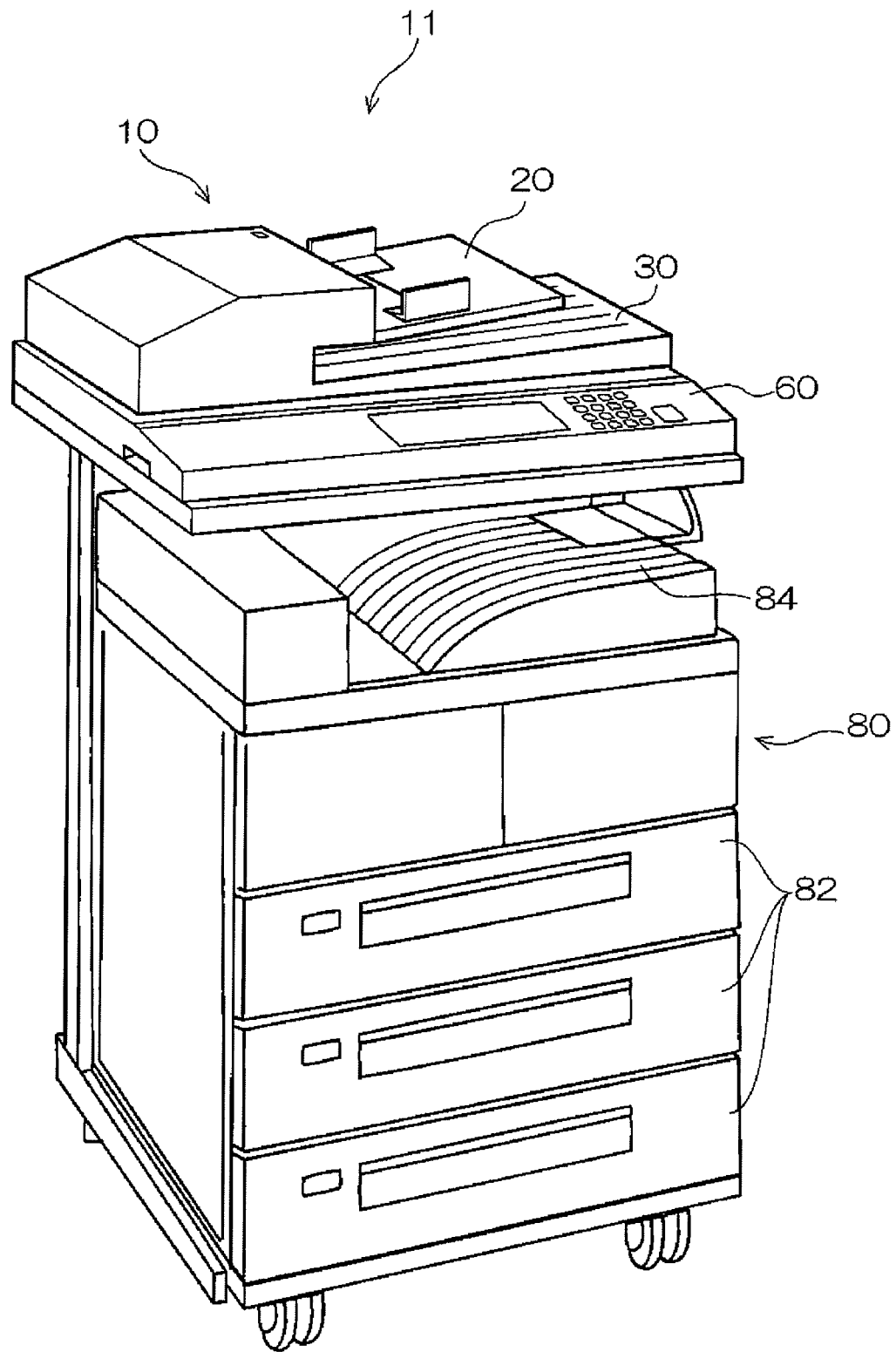
FIG. 9 is an outline view schematically illustrating an image forming apparatus according to a fourth embodiment.

As shown in FIG. 9, the image forming apparatus 11 of the fourth embodiment is configured to include the image reading apparatus 10, an image forming unit 80, a paper feeding unit 82, and a print ejection unit 84. The configuration of the image reading apparatus 10 is the same as that of the image reading apparatus 10 of the first embodiment.

The image forming unit 80 which prints a document image on a paper by an electrophotographic method includes an endless intermediate transfer belt, an image forming unit transferring a toner image of each color (Y: yellow, M: magenta, C: cyan, and K: black) to the intermediate transfer belt, and an optical part forming an electrostatic latent image on a photoreceptor drum by exposing the photoreceptor drum (to be described below) of the image forming unit with laser light modulated based on the image information.

The image forming unit includes the photoreceptor drum, a charger that charges the surface of the photoreceptor drum uniformly, a development part that forms a toner image generated by developing the electrostatic latent image formed on the surface of the photoreceptor drum by the optical part with the toner of each color, and a transfer roller that presses the intermediate transfer belt onto the photoreceptor drum. The intermediate transfer belt is driven by a driving roller connected to a motor.

The image forming unit 80 includes a transfer part that transfers the toner image formed on the intermediate transfer belt on the paper fed from the paper feeding unit 82, a fixing part that fixes the toner image transferred to the paper on the paper, and an ejection roller that ejects the paper passing through the fixing part to the print ejecting unit 84.

The paper feeding unit 82 includes a plurality of paper cassettes receiving papers having different directions, sizes, and paper qualities and a plurality of rollers for taking out the paper from each paper cassette to transport the paper to the transfer part of the image forming unit 80.

According to the image forming apparatus 11 of the fourth embodiment configured as above, the document is read by the image reading apparatus 10, and an image is formed on the paper fed from the paper feeding unit 82 in the image forming unit 80 based on the reading data acquired by correcting the read data using the generated shading correction information.

In the fourth embodiment, the image forming apparatus that adopts the electrophotographic image forming unit has been described, but the present invention may be applied even to an inkjet type image forming apparatus.

In each embodiment, the present invention has been applied to the rear surface image reading unit, but the present invention may be applied even to the generation of the shading correction information of the surface image reading unit.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus, comprising:
   a reading unit that includes a plurality of photoelectric conversion elements,
      wherein the reading unit is configured to output reading information indicating pixel values for each pixel corresponding to each of the photoelectric conversion elements by reading a document and a reference plate; and
      wherein the reading unit is configured to output reference plate reading information by reading the reference plate;
   an extraction unit configured to set a pixel of the reference plate reading information as a notice pixel and repeatedly extract one notice pixel as a target pixel until the number of the target pixels is more than a predetermined value in response to a ratio of a pixel value of the notice pixel to an initial value being more than a predetermined range, a value of the initial value being set according to a pixel position in advance; and
   a generation unit configured to generate correction information,
      wherein, in response to the extraction unit extracting all pixels of the reference plate reading information, the generation unit is configured to generate the correction information by substituting a pixel value of the target pixel with a correction value using the initial value in the reference plate reading information, and
      wherein, the generation unit is configured to, in response to the extraction unit not extracting all the pixels of the reference plate reading information, generate the correction information by one from among:
         substituting the pixel value of the target pixel with the correction value using the initial value and substituting a pixel value of a pixel which is not set as the notice pixel with the initial value in the reference plate reading information; and
         setting the pixel values of all the pixels as the initial value in the reference plate reading information.

2. The image reading apparatus of claim 1, further comprising:
   a detection unit configured to detect an area of the document corresponding to an arrangement direction of the plurality of photoelectric conversion elements,
   wherein the extraction unit is configured to sequentially set a pixel corresponding to the area of the document among the pixels of the reference plate reading information as the notice pixel, and
   wherein, the generation unit is configured to, in response to the extraction unit not extracting at least pixels corresponding to the area of the document in the reference plate reading information, generate correction information by substituting the pixel value of the target pixel with the correction value using the initial value and substituting at least a pixel value of a pixel which corresponds to the area of the document and which is not set as the notice pixel with the initial value, in the reference plate reading information.

3. The image reading apparatus of claim 1, further comprising:
   a correction unit configured to correct document reading information output by reading the document using the reading unit based on the correction information generated by the generation unit.

4. An image forming apparatus, comprising:
   the image reading apparatus according to claim 3; and
   an image forming unit configured to form an image on a recording medium based on the document reading information corrected by the correction unit.

5. A non-transitory computer-readable medium storing a program that causes a computer to execute image reading processing by using a plurality of photoelectric conversion elements, the image reading processing comprising:
   outputting reading information indicating pixel values for each pixel corresponding to each of the photoelectric conversion elements by reading a document and a reference plate,
      wherein reference plate reading information is output by reading the reference plate;
   setting a pixel of the reference plate reading information as a notice pixel;
   extracting repeatedly one notice pixel as a target pixel until the number of the target pixels is more than a predetermined value in response to a ratio of a pixel value of the notice pixel to an initial value being more than a predetermined range, a value of the initial value being set according to a pixel position in advance; and
   in response to all pixels of the reference plate reading information being extracted, generating correction information by substituting a pixel value of the target pixel with a correction value using the initial value in the reference plate reading information; and
   in response to all the pixels of the reference plate reading information not being extracted, generating correction information by one from among:

substituting the pixel value of the target pixel with the correction value using the initial value and substituting a pixel value of a pixel which is not set as the notice pixel with the initial value in the reference plate reading information; and
setting the pixel values of all the pixels as the initial value in the reference plate reading information.

\* \* \* \* \*